United States Patent
Balogh et al.

(10) Patent No.: US 11,951,966 B2
(45) Date of Patent: Apr. 9, 2024

(54) STEERING CONTROL SYSTEM AND A METHOD FOR CONTROLLING STEERING

(71) Applicant: KNORR-BREMSE SYSTEME FUER NUTZFAHRZEUGE GMBH, Munich (DE)

(72) Inventors: Levente Balogh, Szigetszentmiklos (HU); Markus Klein, Pforzheim (DE); Tamas Rozsa, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 905 days.

(21) Appl. No.: 16/328,514

(22) PCT Filed: Sep. 8, 2017

(86) PCT No.: PCT/EP2017/072554
§ 371 (c)(1),
(2) Date: Feb. 26, 2019

(87) PCT Pub. No.: WO2018/046644
PCT Pub. Date: Mar. 15, 2018

(65) Prior Publication Data
US 2021/0309192 A1    Oct. 7, 2021

(30) Foreign Application Priority Data
Sep. 12, 2016 (EP) ..................... 16188297

(51) Int. Cl.
*B60T 8/1755* (2006.01)
*B60T 8/26* (2006.01)
*B60T 8/28* (2006.01)

(52) U.S. Cl.
CPC ............ *B60T 8/17557* (2013.01); *B60T 8/26* (2013.01); *B60T 8/28* (2013.01); *B60T 2201/087* (2013.01)

(58) Field of Classification Search
CPC .......... B60T 8/17577; B60T 2201/087; B60T 2270/86; B60W 30/18109
See application file for complete search history.

(56) References Cited

U.S. PATENT DOCUMENTS 8,457,868 B2 * 6/2013 Tange ................... B60W 30/12
                                                      701/41
9,567,003 B2 * 2/2017 Kageyama ............. B62D 6/003
(Continued)

FOREIGN PATENT DOCUMENTS

CN    1522910 A      8/2004
CN    1796204 A  *  7/2006 ............. B60R 21/00
(Continued)

OTHER PUBLICATIONS

International Search Report dated Nov. 9, 2017, of the corresponding International Application PCT/EP2017/072554 filed Sep. 8, 2017.

*Primary Examiner* — Christian Chace
*Assistant Examiner* — Katherine Marie Fitzharris
(74) *Attorney, Agent, or Firm* — NORTON ROSE FULBRIGHT US LLP; Gerard A. Messina

(57) ABSTRACT

A steering control system for a commercial vehicle having a braking system to brake dissymmetrically wheels. The steering control system, including a sensor unit and a control module, is configured to detect a braking request or deceleration of the vehicle and/or to detect a lateral offset and to generate a brake indication signal and/or steering demand. The control module is configured to receive the brake indication signal and/or steering demand. If the steering demand is below a predetermined threshold value, the (Continued)

control module is configured to generate the steering signal only if the brake indication signal indicates a braking request. If the steering demand exceeds the predetermined threshold value, the control module is configured to generate the steering signal even if the brake indication signal indicates no braking request. The control module provides the steering signal to the braking system to brake the vehicle dissymmetrically to steer the vehicle.

9 Claims, 6 Drawing Sheets

(56) References Cited

U.S. PATENT DOCUMENTS

| | | | | |
|---|---|---|---|---|
| 10,046,743 | B2* | 8/2018 | Jonasson | B62D 9/005 |
| 2002/0189889 | A1 | 12/2002 | Demerly | |
| 2005/0206224 | A1* | 9/2005 | Lu | B60T 8/246 |
| | | | | 303/7 |
| 2009/0228174 | A1* | 9/2009 | Takagi | B60T 8/17558 |
| | | | | 701/41 |
| 2013/0253793 | A1* | 9/2013 | Lee | B60W 50/029 |
| | | | | 701/70 |
| 2017/0174194 | A1* | 6/2017 | Baumgaertner | B60T 8/17616 |
| 2018/0105180 | A1* | 4/2018 | Fung | A61B 5/1122 |

FOREIGN PATENT DOCUMENTS

| | | |
|---|---|---|
| CN | 1796204 A | 7/2006 |
| CN | 102139696 A | 8/2011 |
| CN | 102267462 A | 12/2011 |
| CN | 102897169 A | 1/2013 |
| CN | 103963783 A | 8/2014 |
| DE | 10017279 A2 | 10/2000 |
| DE | 102007026215 A1 | 12/2008 |
| EP | 2589520 A1 | 5/2013 |
| EP | 2853453 A1 | 4/2015 |
| EP | 2998175 A1 | 3/2016 |
| WO | WO-2014054937 A1 * | 4/2014 ................ B60T 7/12 |

* cited by examiner

STEERING CONTROL SYSTEM AND A METHOD FOR CONTROLLING STEERING

FIELD OF THE INVENTION

The present invention relates to a steering control system and a method for controlling steering and, in particular, to a system for controlling the lateral movement of a vehicle using a Steer-by-Brake process.

BACKGROUND INFORMATION

Vehicles are nowadays equipped with a number of assist functions to support the driver in various situations. For example, a traffic jam assist function helps the driver to keep a secure distance to a vehicle ahead while following the traffic lane. Such traffic jam assist function is implemented in conventional systems only during low speed operations as for example in stop & go situations. In these situations, however, the vehicle has to brake frequently resulting in an increased brake lining wear. In addition, in conventional systems it is difficult to follow the traffic lane autonomously, because the autonomous actuation of the steering system, in particular for commercial vehicles, is technically very involved.

Therefore, there is a demand for a steering control system which can be used easily, in particular, for the traffic jam situation without increasing the brake lining wear.

SUMMARY OF THE INVENTION

At least some of the above-mentioned problems may be solved by a steering control system as described herein, a vehicle as described herein, and a method for controlling steering as described herein. The further descriptions herein relate to further specifically advantageous realizations of the steering control system as described herein.

The present invention relates to a steering control system for a commercial vehicle. The commercial vehicle comprises a braking system that is configured, based on a steering demand, to brake dissymmetrically side wheels of the vehicle to steer the vehicle based on a resulting yaw moment. The steering control system comprises a sensor unit and a control module. The sensor unit is configured to detect a braking request or a deceleration of the vehicle and/or to detect a lateral offset and, based thereon, to generate a brake indication signal and/or the steering demand. The control module is configured to receive the brake indication signal and/or the steering demand. The control module is further configured, if the steering demand is below a predetermined threshold value, to generate the steering signal if the brake indication signal indicates a braking request. On the other hand, if the steering demand exceeds the predetermined threshold value, the control module is configured to generate the steering signal even if the brake indication signal is not present or indicates no braking request. Finally, the control module is configured to provide the steering signal to the braking system to brake the vehicle dissymmetrically and thereby to steer the vehicle. For example, in response to the steering signal, the front right wheel may be braked stronger than the front left wheel (or vice versa) resulting in a right turn (or left turn).

The lateral offset may be any state, position or orientation of the vehicle that may be corrected or compensated for by steering the vehicle. The sensor unit may include a braking sensor and can be any device or control unit which is able to detect any change or any intended change in the velocity of the vehicle. For example, the braking sensor may couple to a brake pedal actuated by the driver or a cruise control to receive a signal indicative of a desired decrease in the vehicle speed. The sensor unit may further include a sensor (e.g. a camera, a radar, a lidar, an ultrasonic sensor, etc.) that is able to detect the lateral offset.

As a result, small deviations from an ideal position, orientation or state of the vehicle can be corrected immediately if the vehicle is to brake, otherwise the correction is postponed.

This will decrease the wear. On the other hand, if the deviation is such that an immediate action is needed, the steering control system will not wait until the next brake action, but corrects the orientation immediately by using the steer-by-brake function. This decision is made based on the threshold which indicates an acceptable deviation from the ideal position (e.g. an angular alignment of the vehicle longitudinal axle with a middle line of a traffic lane).

The vehicle may, for example, comprise at least one sensor to detect the misalignment of the vehicle with a traffic lane and the control module is optionally configured to receive, as the steering demand, a sensor signal from the at least one sensor indicating the misalignment and to generate, based thereon, the steering signal to correct the misalignment to further follow the lane. This alignment correction can be combined with the distant control to the object ahead, i.e. any unsafe distance can be corrected by braking the vehicle accordingly while correcting at the same time the alignment with the traffic lane.

The commercial vehicle may further comprise a steering system to steer wheels, wherein the steering system is configured to steer the vehicle in response to a primary steering signal by controlling a steering angle of steered wheels. Optionally, the control module comprises a selection module configured to select a first steering mode or a second steering mode, wherein in the first steering mode the vehicle is steered by controlling the steering angle of the wheels, and in the second steering mode the vehicle is steered by controlling a braking signal for at least one vehicle wheel. The control module may further be configured to generate the primary steering signal (indicating a primary steering demand) if the first steering mode is selected, and to generate the steering signal (indicating the steering demand) if the second steering mode is selected. The primary steering demand may, for example, be associated with an actuation of the steering wheel by driver. It is understood that both steering modes may or may not be valid at the same time, i.e. the steering system may either be in the first steering mode or in the second steering mode.

Optionally, the selection module comprises an interface for the driver of the commercial vehicle to enable the driver to select (or switch) either the first steering mode or the second steering mode in response to an interaction with the interface. Thus, the driver can intentionally turn on/off the second steering mode and the switching may not be performed automatically by the vehicle as e.g. in stabilization systems such as ESP.

The commercial vehicle may be adapted to be operated in a traffic jam assistant mode by using a traffic jam assistant unit, and the control module may be configured to steer the vehicle in the traffic jam assistant mode based on the steering signal. Again, the activation of the traffic jam assistant mode may be done by the driver explicitly. In the traffic jam assistant mode, the vehicle may follow an object ahead (e.g. another vehicle) while maintaining a safe distance to the object and staying inside a given traffic lane and thus does not pass the object ahead.

The vehicle may comprise at least one lane sensor (e.g. a camera) for detecting a lane and a neighboring lane. The control module may then be configured to receive sensor signals from the lane sensor and to generated a steering signal to change the lane to the neighboring lane autonomously.

In addition, the vehicle may comprise at least one object sensor for detecting a vehicle ahead, and the control module may be configured to receive sensor signals from the object sensor and to generate the steering signal to follow the vehicle ahead, optionally even during lane change.

The present invention relates also to a vehicle with a braking system and steering control system, as it was defined before. The vehicle may, in particular, be a commercial vehicle with a steering system having a positive scrub radius to amplify steering operation when braking dissymmetrically. The steering system of the vehicle may comprise a steering column, which is controlled to be turned during steering in the first steering mode (but not in the second steering mode).

The present invention relates also to a method for controlling a steering of a commercial vehicle. The commercial vehicle comprises a braking system configured to brake dissymmetrically side wheels of the vehicle to steer the vehicle as a result of a generated yaw moment. The method comprises the steps of:
  receiving sensor signals indicating a braking request or a deceleration and a lateral offset of the vehicle;
  based thereon, generating a brake indication signal and/or a steering demand;
  if the steering demand is below a predetermined threshold value, generating a steering signal if the brake indication signal indicates a braking request, and
    if the steering demand exceeds the predetermined threshold value, generating the steering signal even if the brake indication signal is not present or indicates no braking request; and
    providing the steering signal to the braking system to brake at least one side wheel of the vehicle.

This method may also be implemented in software or a computer program product. Embodiments of the present invention can, in particular, be implemented in an engine control unit or by software or a software module in an ECU (electronic control unit). Therefore, embodiment relate also to a computer program having a program code for performing the method, when the computer program is executed on a processor.

According to the present invention the steering actuators are not actively used to control the lateral movement of the vehicle—in particular not for steering the vehicle in the special situation as the autonomous driving. Instead, according to embodiments, the steer-by-braking function is actively employed as a regular driving function. This function is not only being used as a backup system to enable a steering in case the regular steering system fails. This new normal operation mode is especially employed during a traffic jam situation where frequent stopping operations can be used to re-align the vehicle along a traffic lane. Hence, when the traffic jam assistant function is activated, the steering control system can likewise be switched in the second steering mode to enable the steer-by-brake function. Further advantageous applications of embodiments of the present invention relate to functions such as preventing a lane departure of the vehicle at regular cruising speed or to follow a vehicle ahead.

A particular advantage of embodiments of the present invention is that active steering actuators are not needed while still enabling an autonomous control of the vehicle. Since such active steering actuators are expensive and moreover not standard in commercial vehicles, embodiments can be easily implemented even in heavy commercial vehicles to enable an automatic steering. This is made possible by using the braking system to correct the orientation of the vehicle along the road.

Some examples of the system and/or methods will be described in the following by way of examples only, and with respect to the accompanying figures.

DETAILED DESCRIPTION

Figure 1:
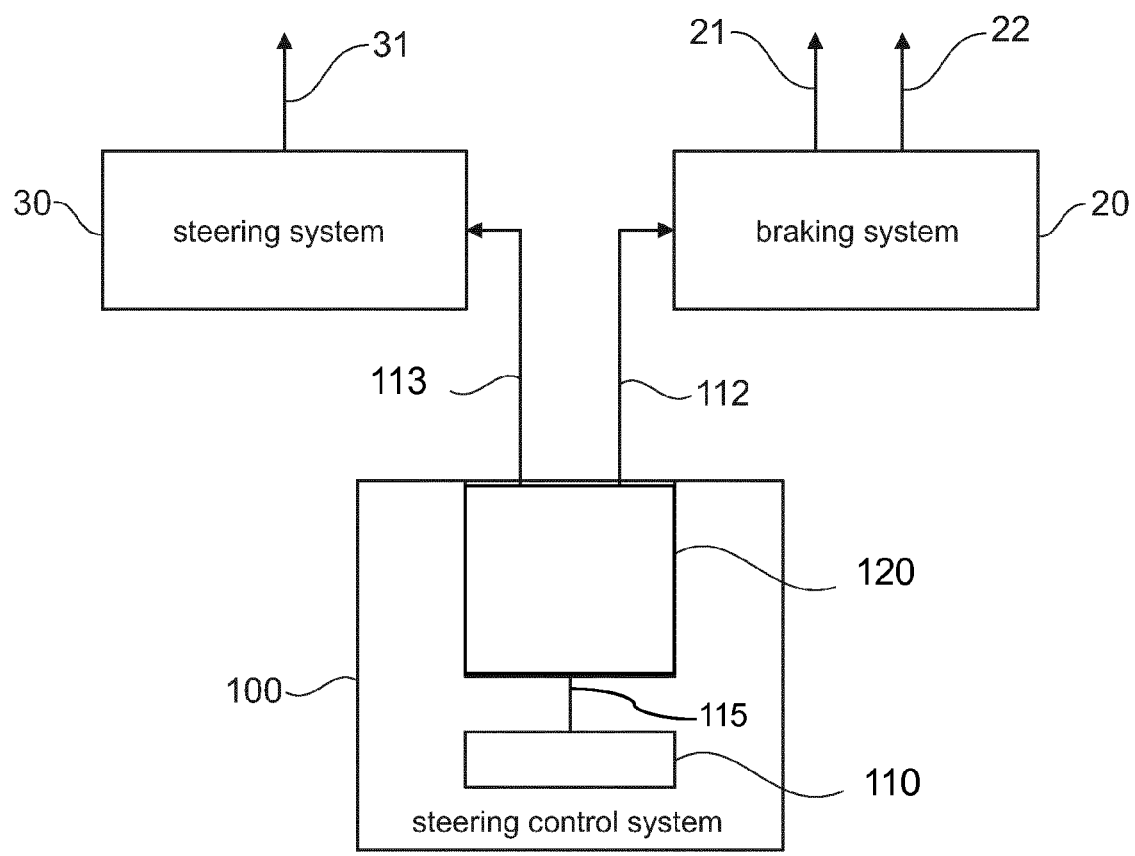
FIG. 1 depicts a steering control system according to an embodiment of the present invention.

FIG. 1 shows a steering control system 100 suitable for a commercial vehicle, which comprises a braking system 20. The braking system 20 is configured, based on a steering demand, to brake dissymmetrically side wheels of the vehicle 10 to steer the vehicle 10 based on a resulting yaw moment. The steering control system comprises a sensor unit 110 and a control module 120. The sensor unit 110 is configured to detect a braking request or a deceleration of the vehicle and/or to detect a lateral offset of the vehicle. The sensor unit 110 generates a corresponding brake indication signal 115 and/or the steering demand indicating an amount of braking and/or steering needed to correct the position or offset of the vehicle. The control module 120 is configured to receive the brake indication signal and/or the steering demand 115. The control module 120 is further configured, if the steering demand is below a predetermined threshold value, to generate the steering signal 112 (only) if the brake indication signal 115 indicates a braking request. On the other hand, if the steering demand exceeds the predetermined threshold value, the control module 120 is configured to generate the steering signal 112 even if the brake indication signal 115 indicates no braking request. The control module 120 is further configured to provide the steering signal 112 to the braking system 20 to brake the vehicle 10 dissymmetrically and thereby to steer the vehicle. The steering demand can further be generated by any assist function implemented in the vehicle or, optionally, as a result of an interaction of the driver (e.g. using the steering wheel).

The control module 120 may further comprise a selection module and is configured to generate the steering signal 112 indicating a steering demand in a first steering mode and a primary steering signal 113 indicating a primary steering demand in a second steering mode. The selection module is configured to switch between the first steering mode and the second steering mode, wherein in the first steering mode the vehicle is steered by turning vehicle wheels in response to the primary steering signal 113. In the second steering mode a steering of the vehicle is achieved by generating a braking signal 21, 22 for at least one vehicle wheel resulting in a yaw moment applied to the vehicle. This yaw moment results in a rotation force and is controlled by the strength or degree of the dissymmetrical braking force.

Independently of the concrete arrangement in the steering control system 100, either the primary steering signal 113 (in the first steering mode) or the steering signal 112 (in the second steering mode) is generated. The primary steering signal 113 is submitted to the steering system 30 which provides an actuator signal 31 to the steering actuators in order to turn the steered wheels to the left or to the right (for example using a power steering system), whereas the steering signal 112 is provided to the braking system 20. Based on the steering signal 112 the braking system 20 generates different or dissymmetrical braking signals 21, 22, which may be provided to the right wheel and left wheel. For example, the steering signal 112 indicates a demand for a right turn of the vehicle. As a result, the braking system 20 may only provide a braking signal 22 to the right wheel in order to perform a right movement of the vehicle. Of course, a strength of the dissymmetrical braking signals 21, 22 are adjusted to perform a desired turning operation without destabilizing the vehicle for example, by applying a sharp strong braking force only on one wheel. In addition, it is understood that both steered wheels may receive a respective braking signal 21, 22, but the vehicle will be steered if one of them is stronger.

Embodiments implement thus the steer-by-brake (SBB) function as a normal operation mode (comfort function) in vehicles, wherein the brakes on each wheel are controlled separately to influence the steering of the vehicle. Embodiments may be implemented at all wheels of the vehicle. However, the most efficient steering effect may be achievable if only the wheels on the front axle are used for the SBB-function. A person skilled in the art will appreciate that this concept has particular advantages for vehicles with a positive scrub radius resulting in an amplification of the steering effect in case dissymmetric (or asymmetric) friction forces apply to the left/right wheels. A positive scrub radius is typically implemented in commercial vehicles, since it supports a steering operation. Thus, embodiments of the present invention have particular advantages for commercial vehicles.

Figure 2:
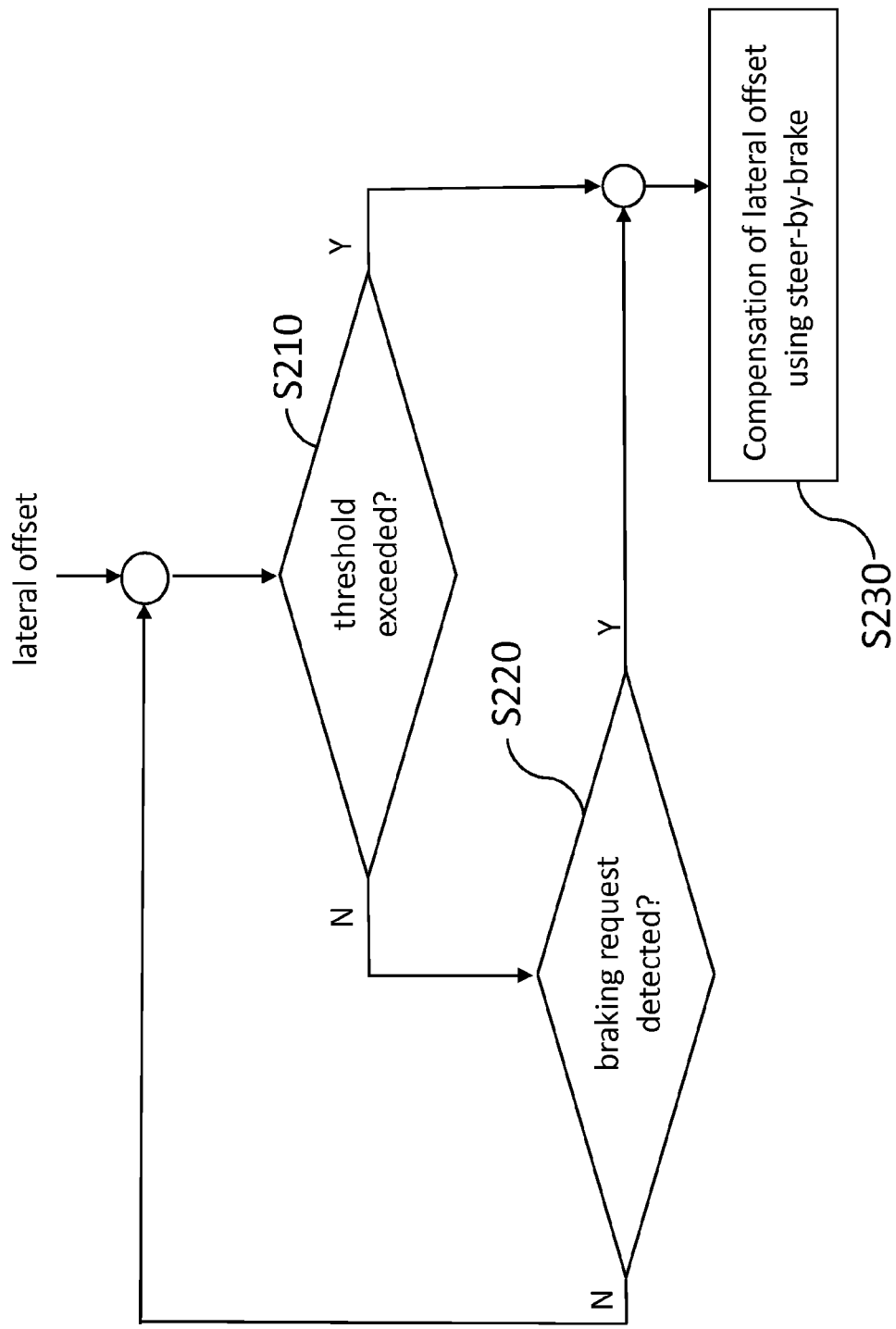
FIG. 2 depicts a flow chart for deciding when the steer-by-brake-function is employed.

FIG. 2 illustrates the operation mode of the steering control system 100. The sensor unit 110 may detect a misalignment of the vehicle with an exemplary traffic lane representing a lateral offset that should be corrected. However, this lateral offset may or may not be sufficiently severe to be corrected immediately or, optionally, at a later time. Therefore, the detected lateral offset is compared with a threshold value (state S210). If this comparison indicates that the lateral offset exceeds the threshold value an immediate compensation for the lateral offset using the steer-by-brake function is initiated (see state S230). If, on the other hand, the threshold value is not exceeded, the steering control system 100 checks whether a brake indication signal is issued indicating a braking request (state S220). If such braking request is detected, the control module 120 will generate the steering signal 112 to compensate the lateral offset using the steer-by-brake function. If no such brake request is detected, the system waits for as long as a braking request will be detected or, if the threshold value will be exceeded in the meantime, the lateral offset will be corrected immediately—even without awaiting the braking request.

This provides the advantage that minor misalignments of the vehicle with the exemplary traffic lane may not be immediately corrected, but a future braking request can be used for the compensation of the lateral offset. Only in the case, when the threshold value is exceeded indicating that a correction should be performed immediately, the lateral offset can be compensated without awaiting a braking request by using the steer-by-brake function.

Figure 3:
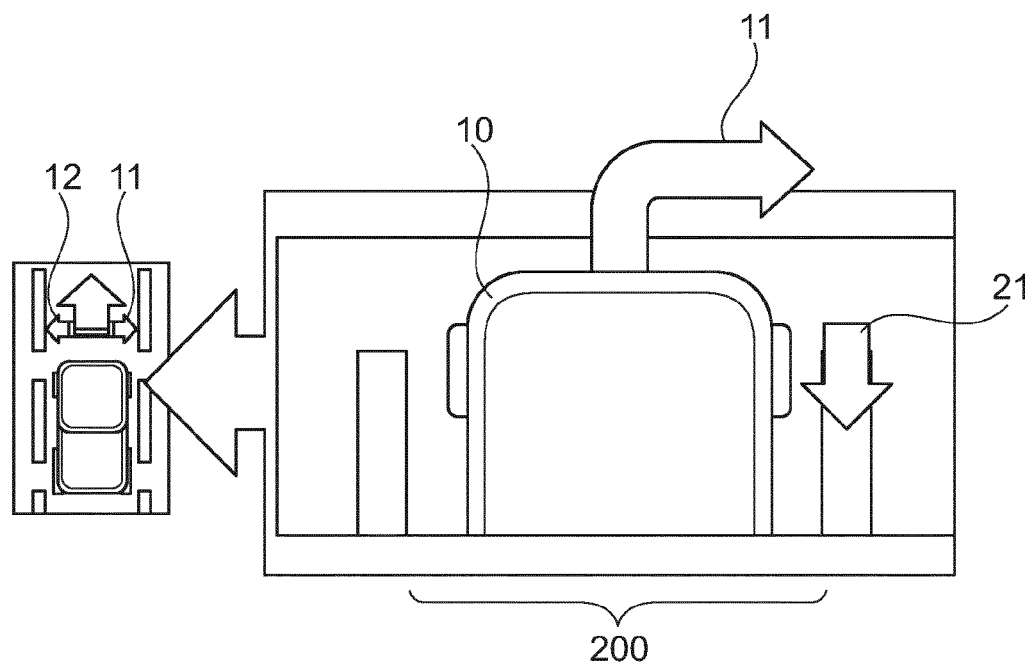
FIG. 3 illustrates how embodiments handle a lane following situation.

FIG. 3 depicts a situation, where a commercial vehicle 10 follows a traffic lane 200 and a braking force 21 is applied to the front right wheel. As a consequence, the vehicle moves to the right as indicated by the arrow 11. This effect can be used to keep an alignment of the vehicle 10 along the traffic lane 200 (see left hand side in FIG. 3). For example, a deviation of the vehicle to the left-hand side can be corrected by a braking force on the right wheel resulting in the right movement 11, whereas a deviation to the right-hand side can be corrected by applying a braking force on the left wheel resulting in a left movement 12 of the vehicle. As a result, the vehicle can automatically stay inside the traffic lane 200 without the need to actuate actively the steering system 30 of the vehicle 10.

Figure 4A:
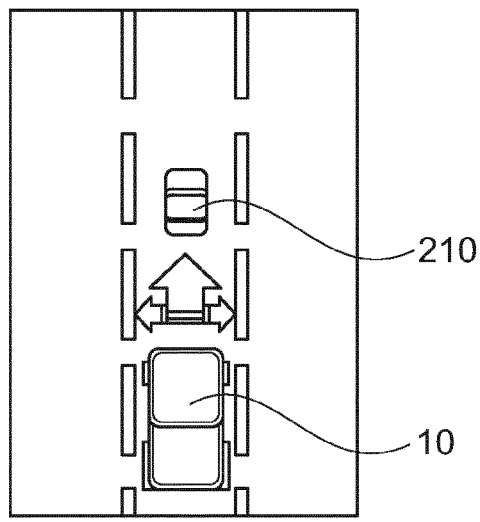
FIGS. 4A and 4B illustrate a traffic jam assist scenario.
Figure 4B:
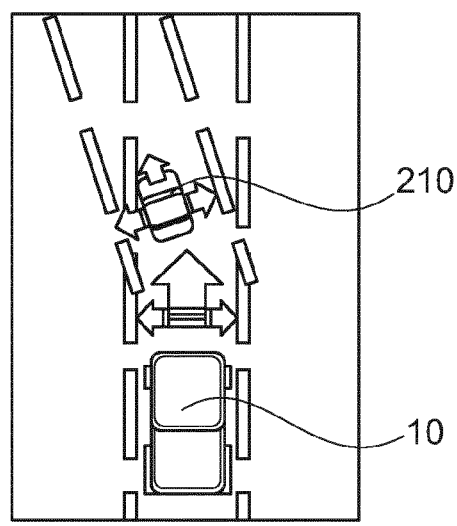

FIG. 4A and FIG. 4B illustrate the traffic jam assist scenario, wherein in FIG. 4A the vehicle 10 follows an object 210 along the traffic lane 200. Again, the alignment of the vehicle 10 along the traffic lane 200 can be maintained as described in FIG. 3. In FIG. 4B the vehicle 10 follows the object 210 when the object 210 leaves the traffic lane 200, for example, to make a lane change. For both cases, the needed steering operations can be carried out using the steering control system 100.

Figure 5:
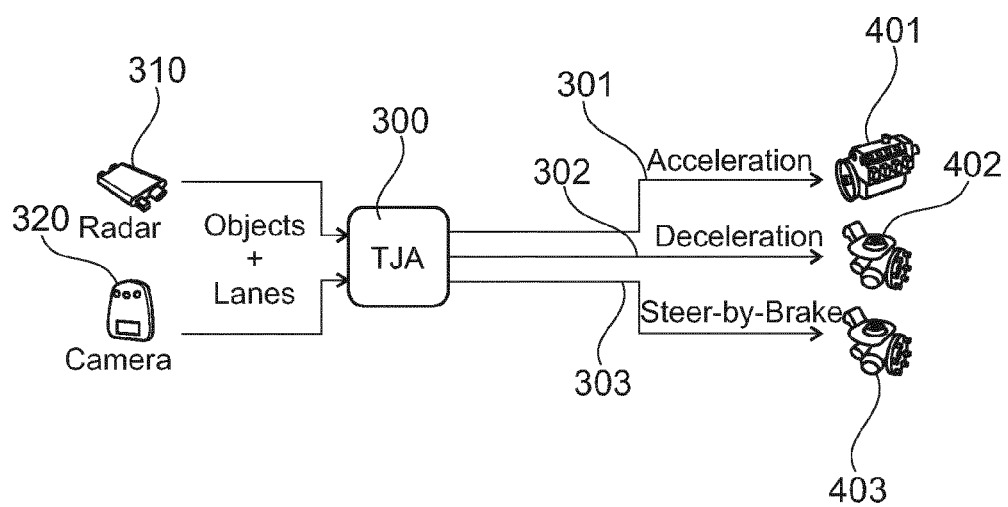
FIG. 5 shows the architecture used for the traffic jam assist unit according to embodiments.

FIG. 5 shows the architecture used for the traffic jam assist function. This architecture involves a traffic jam assist (TJA) unit 300, which is connected to one or more sensors 310, 320, which may be part of the sensor unit 110. For example, a radar sensor 310 can measure the distance to the object 210 ahead and a camera sensor 320 can keep track of the traffic lane 200 and provides a sensor signal in case the vehicle 10 tends to leave the traffic lane 200. This may, for example, be achieved by detecting the lane markings, which should be in a particular angular range, when viewed from the vehicle 10, if the vehicle 10 is running in the middle of the traffic lane 200.

The sensor data of the radar sensor 310 and the exemplary camera 320 are provided for the traffic jam assist unit 300 which is able to detect the object 210, using the radar sensor 310, and to detect any possible lane departure using the exemplary camera 320. The ideal position for the vehicle 10 may, be defined using particular thresholds for the distance to the object 210 ahead and for the angles to the traffic lane markings. Any deviation from a range of acceptable positions may trigger an action in the traffic jam assist unit 300. For example, control signals 301, 302, 303 can be generated to actuate actuators of the vehicle 10 to correct the position and/or alignment of the vehicle 10. The traffic jam assist unit 300 may generate an acceleration signal 301 and provide this signal to an engine 401 in order to accelerate the vehicle 10. The traffic jam assist unit 300 can also generate a deceleration signal 302 and send this signal to the braking system actuators 402 in order to slow down the vehicle 10. According to the present invention, the traffic jam assist unit 300 can further generate a Steer-by-Brake signal 303 and provide this signal to the braking system actuators 403 assigned to this function (e.g. the front axle wheels) to dissymmetrically brake wheels of the vehicle 10 to thereby correct the orientation of the vehicle 10.

The SBB signal 303 may be the second steering signal 112 (see FIG. 1), if the steering control system 100 is included in the traffic jam assist unit 300. Otherwise, the SBB signal 303 can be sent to the steering control system 100 which interprets the signal as a steering demand and generates, based thereon, an appropriate steering signal 112 to be sent to the braking system 20.

Figure 6:
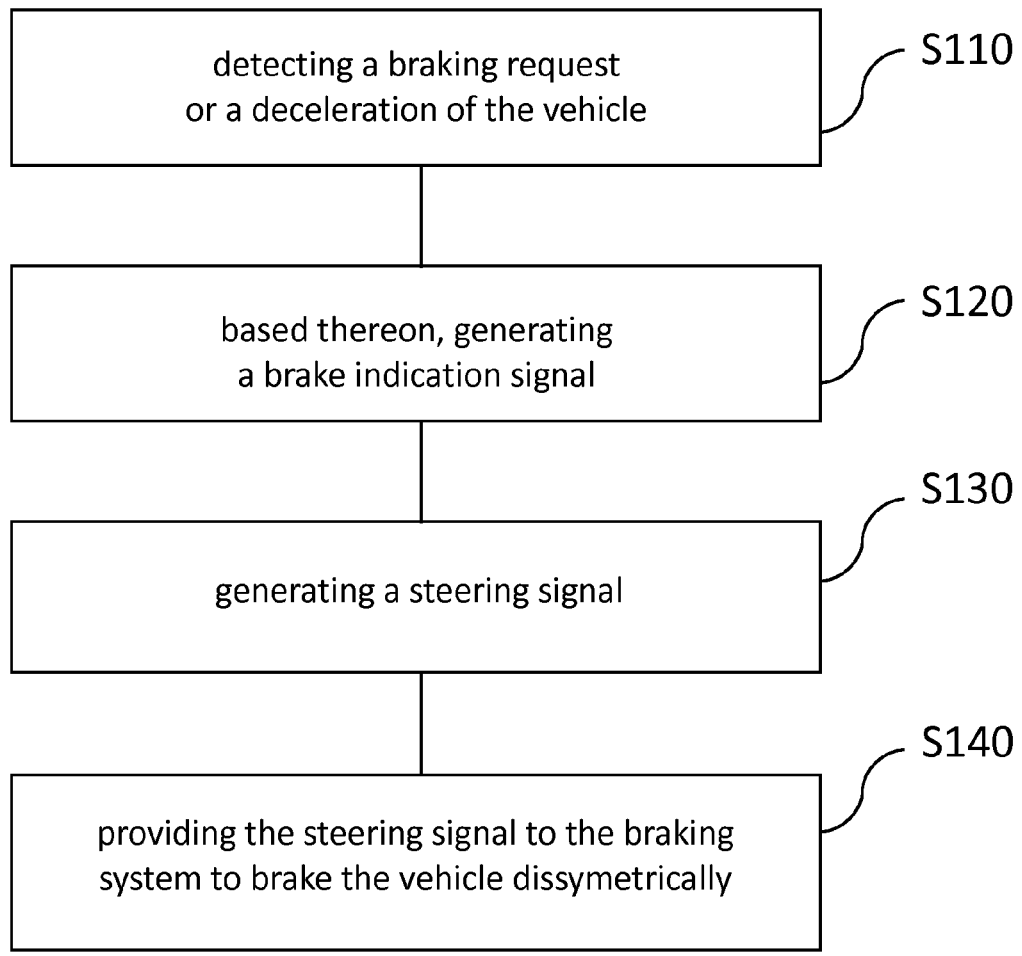
FIG. 6 shows a flow diagram of a method for controlling steering for the commercial vehicle.

FIG. 6 depicts a flow diagram of a method for controlling steering of the commercial vehicle. The method comprises the steps of:
- receiving S110 sensor signals indicating a braking request or a deceleration and/or a lateral offset of the vehicle 10;
- based thereon, generating S120 a brake indication signal 115 and/or the steering demand;
- if the steering demand is below a predetermined threshold value, generating S130 the steering signal 112 (only) if the brake indication signal 115 indicates a braking request, and
- if the steering demand exceeds the predetermined threshold value, generating S130 the steering signal 112 even if the brake indication signal is not present or indicates no braking request;
- and
- providing S140 the steering signal 112 to the braking system 20 to brake at least one side wheel of the vehicle 10.

Optionally, the method may further comprise the step of switching between or selecting a first steering mode and a second steering mode, wherein the first steering mode performs a steering of the vehicle by turning vehicle wheels and the second steering mode performs a steering of the vehicle by generating a braking signal for at least one vehicle wheel resulting in a yaw moment applied to the vehicle. An optional step is to generate a primary steering signal indicating a steering demand if the first steering mode is switched. The steering signal indicating a steering demand is generated if the second steering mode (SBB mode) is switched.

This method may also be a computer-implemented method. A person of skill in the art would readily recognize that steps of various above-described methods may be performed by programmed computers or by any vehicle control unit. Embodiments are also intended to cover program storage devices, e.g., digital data storage media, which are machine or computer readable and encode machine-executable or computer-executable programs of instructions, wherein the instructions perform some or all of the acts of the above-described methods, when executed on a computer or processor.

The advantage of embodiments of the present invention is to realize the steering functions without the need of any additional actuator, but using the already installed braking system 20. By using this system, the control of the lateral movement of the vehicle can be achieved without major modifications of present or of new vehicles. It is even possible that older vehicle architectures can be retrofitted with the new function without involving high costs.

Since current vehicles do not have active steering systems, which could support new functions, embodiments of the present invention can be easily implemented in these commercial vehicles without the need of major modifications.

According to the present invention the application of the different braking torques (asymmetric braking) is delayed to a time point when no acceleration is required, but a desired deceleration can be used for lateral interventions.

In addition, embodiments use the SBB-function not as a backup solution or as emergency interventions, but as regular operation mode. For example, the SBB-function may prevent a lane departure of the vehicle which only intervenes once for a short time to push the vehicle back into its lane. According to embodiments, SBB interventions are limited during an acceleration of the vehicle to a minimum, but control the lateral movement only if a deceleration of the vehicle is wanted. For example, a TrafficJamAssist can be realized without an active steering actuator. The function may only be active in low speed situations and in stop & go situations, where the vehicle needs to accelerate and decelerate all the time and the SBB may only be used during deceleration, if possible. With this solution the lining wear and additional fuel consumption becomes negligible.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

The list of reference signs is as follows:
- 10 vehicle
- 11,12 right/left movement
- 20 braking system
- 21,22 dissymmetrical braking signals
- 30 steering system
- 31 steering actuator signal
- 100 steering control system
- 110 sensor unit
- 112 steering signal
- 113 primary steering signal
- 115 brake indication signal/steering demand
- 120 control module
- 200 traffic lane
- 300 traffic jam assistant unit
- 310 radar sensor
- 320 camera
- 301, 302, . . . control signals of the traffic jam assistant unit
- 401 engine
- 402 braking system actuators
- 403 braking system actuators assigned for SBB function

The invention claimed is:

1. A steering control system for a commercial vehicle, comprising:
- a sensor unit for detecting a braking request or a deceleration of the vehicle and for detecting a lateral offset and, based thereon, to generate a brake indication signal and a steering demand, wherein the commercial vehicle includes a braking system, which is configured, based on the steering demand, to brake dissymmetrically side wheels of the vehicle to steer the vehicle based on a resulting yaw moment; and
- a control module to receive the brake indication signal and the steering demand;
- wherein when the steering demand is below a predetermined threshold value, the control module generates a steering signal only when the brake indication signal indicates a braking request,
- wherein when the steering demand exceeds the predetermined threshold value, the control module generates the steering signal even when the brake indication signal is not present or indicates no braking request, wherein the control module is configured to provide the steering signal to the braking system to brake the vehicle dissymmetrically to steer the vehicle, wherein the sensor unit includes at least one sensor to detect a misalignment representing the lateral offset, of the vehicle with a traffic lane, and wherein the control module is configured to receive, as the steering demand, a sensor signal from the at least one sensor indicating the misalignment and to generate the steering signal to correct the misalignment and to further follow the traffic lane, wherein the commercial vehicle includes a traffic jam assist unit to operate the vehicle in a traffic jam assistant mode, and wherein the control module is configured to steer the vehicle in the traffic jam assistant mode based on the steering signal, wherein the commercial vehicle includes a steering system to steer wheels in response to a primary steering signal by controlling a steering angle of steered wheels, wherein the control module includes a selection module configured to select a first steering mode or a second steering mode, wherein in the second steering mode the vehicle is steered by controlling a braking signal for at least one vehicle wheel, and wherein the control module is configured to generate the steering signal when the second steering mode is selected, wherein the traffic jam assist unit is configured to generate a steer-by-brake signal and provide the steer-by-brake signal to braking system actuators assigned to the steer-by-brake function to dissymmetrically brake wheels of the vehicle to correct an orientation of the vehicle, wherein when the traffic jam assistant mode is activated, the steering control system is switched in the second steering mode to enable the steer-by-brake function, by using the steer-by-brake signal as the steering signal, wherein the lateral offset is any state, position or orientation of the vehicle that is corrected or compensated for by steering the vehicle, wherein the sensor unit includes a braking sensor, including a camera, radar, lidar, or ultrasonic sensor, for detecting the lateral offset, wherein deviations smaller than a threshold deviation associated to the predetermined threshold value from an ideal position, orientation or state of the vehicle are corrected immediately if the vehicle is to brake, otherwise the correction is postponed until a future braking request which is used to compensate the lateral offset, and wherein when the deviation does require an immediate action, the steering control system does not wait until the next brake action, but corrects the state, position or orientation immediately by using the steer-by-brake function, wherein the action is made based on a threshold which indicates the threshold deviation from the ideal state, position or orientation.

2. The steering control system of claim 1, wherein the control module is configured to generate the primary steering signal when the first steering mode is selected.

3. The steering control system of claim 2, wherein the selection module includes an interface for the driver of the commercial vehicle to enable the driver to select either the first steering mode or the second steering mode in response to an interaction with the interface.

4. The steering control system of claim 1, wherein the vehicle includes at least one lane sensor for detecting a lane and a neighboring lane, and wherein the control module is configured to receive sensor signals from the lane sensor and to generate the steering signal to change the lane to the neighboring lane autonomously.

5. The steering control system of claim 1, wherein the vehicle includes at least one object sensor for detecting a vehicle ahead, and wherein the control module is configured to receive sensor signals from the object sensor and to generate the steering signal to follow the vehicle ahead.

6. A vehicle, comprising:
a braking system, which is configured, based on a steering demand, to brake dissymmetrically side wheels of the vehicle to steer the vehicle based on a resulting yaw moment, wherein the vehicle is a commercial vehicle; and a steering control system, including:
a sensor unit for detecting a braking request or a deceleration of the vehicle and for detecting a lateral offset and, based thereon, to generate a brake indication signal and a steering demand; and a control module to receive the brake indication signal and the steering demand;

wherein when the steering demand is below a predetermined threshold value, the control module generates a steering signal only when the brake indication signal indicates a braking request, wherein when the steering demand exceeds the predetermined threshold value, the control module generates the steering signal even when the brake indication signal is not present or indicates no braking request, wherein the control module is configured to provide the steering signal to the braking system to brake the vehicle-dissymmetrically to steer the vehicle, wherein the sensor unit includes at least one sensor to detect a misalignment representing the lateral offset, of the vehicle with a traffic lane, and wherein the control module is configured to receive, as the steering demand, a sensor signal from the at least one sensor indicating the misalignment and to generate the steering signal to correct the misalignment and to further follow the traffic lane, wherein the commercial vehicle includes a traffic jam assist unit to operate the vehicle in a traffic jam assistant mode, and wherein the control module is configured to steer the vehicle in the traffic jam assistant mode based on the steering signal, wherein the commercial vehicle includes a steering system to steer wheels in response to a primary steering signal by controlling a steering angle of steered wheels, wherein the control module includes a selection module configured to select a first steering mode or a second steering mode, wherein in the second steering mode the vehicle is steered by controlling a braking signal for at least one vehicle wheel, and wherein the control module is configured to generate the steering signal when the second steering mode is selected, wherein the traffic jam assist unit is configured to generate a steer-by-brake signal and provide the steer-by-brake signal to braking system actuators assigned to the steer-by-brake function to dissymmetrically brake wheels of the vehicle to correct an orientation of the vehicle, wherein when the traffic jam assistant mode is activated, the steering control system is switched in the second steering mode to enable the steer-by-brake function, by using the steer-by-brake signal as the steering signal, wherein the lateral offset is any state, position or orientation of the vehicle that is corrected or compensated for by steering the vehicle, wherein the sensor unit includes a braking sensor, including a camera, radar, lidar, or ultrasonic sensor, for detecting the lateral offset, wherein deviations smaller than a threshold deviation associated to the predetermined threshold value from an ideal position, orientation or state of the vehicle are corrected immediately if the vehicle is to brake, otherwise the correction is postponed until a future braking request which is used to compensate the lateral offset, and wherein when the deviation does require an immediate action, the steering control system does not wait until the next brake action, but corrects the state, position or orientation immediately by using the steer-by-brake function, wherein the action is made based on a threshold which indicates the threshold deviation from the ideal state, position or orientation.

7. The vehicle of claim 6, wherein the vehicle is a commercial vehicle with a steering system having a positive scrub radius to amplify steering operation by dissymmetrical braking, and wherein the steering system includes a steering column which is turned during steering in the first steering mode.

8. A method of controlling a steering for a commercial vehicle, the method comprising:
receiving and/or detecting sensor signals, using a sensor unit, indicating a braking request or a deceleration and a lateral offset of the vehicle, wherein the commercial vehicle includes a braking system, which is configured, based on a steering demand, to brake dissymmetrically side wheels of the vehicle to steer the vehicle based on a resulting yaw moment;

generating, based on the sensor signals, a brake indication signal and the steering demand, wherein when the steering demand is below a predetermined threshold value, generating a steering signal when the brake indication signal indicates a braking request, and wherein when the steering demand exceeds the predetermined threshold value, generating the steering signal even when the brake indication signal is not present or indicates no braking request; and providing the steering signal to the braking system to brake at least one side wheel of the vehicle;

wherein the sensor unit includes at least one sensor to detect a misalignment representing the lateral offset, of the vehicle with a traffic lane, and wherein a control module is configured to receive, as the steering demand, a sensor signal from the at least one sensor indicating the misalignment and to generate the steering signal to correct the misalignment and to further follow the traffic lane, wherein the commercial vehicle includes a traffic jam assist unit to operate the vehicle in a traffic jam assistant mode, and wherein the control module is configured to steer the vehicle in the traffic jam assistant mode based on the steering signal, wherein the commercial vehicle includes a steering system to steer wheels in response to a primary steering signal by controlling a steering angle of steered wheels, wherein the control module includes a selection module configured to select a first steering mode or a second steering mode, wherein in the second steering mode the vehicle is steered by controlling a braking signal for at least one vehicle wheel, and wherein the control module is configured to generate the steering signal when the second steering mode is selected, wherein the traffic jam assist unit is configured to generate a steer-by-brake signal and provide the steer-by-brake signal to braking system actuators assigned to the steer-by-brake function to dissymmetrically brake wheels of the vehicle to correct an orientation of the vehicle, wherein when the traffic jam assistant mode is activated, the steering control system is switched in the second steering mode to enable the steer-by-brake function, by using the steer-by-brake signal as the steering signal, wherein the lateral offset is any state, position or orientation of the vehicle that is corrected or compensated for by steering the vehicle, wherein the sensor unit includes a braking sensor, including a camera, radar, lidar, or ultrasonic sensor, for detecting the lateral offset, wherein deviations smaller than a threshold deviation associated to the predetermined threshold value from an ideal position, orientation or state of the vehicle are corrected immediately if the vehicle is to brake, otherwise the correction is postponed until a future braking request which is used to compensate the lateral offset, wherein when the deviation does require an immediate action, the steering control system does not wait until the next brake action, but corrects the state, position or orientation immediately by using the steer-by-brake function, wherein the action is made based on a threshold which indicates the threshold deviation from the ideal state, position or orientation.

9. A non-transitory computer readable medium having a computer program, which is executable by a processor, comprising:
a program code arrangement having a program code for controlling a steering for a commercial vehicle, by performing the following:
receiving and/or detecting sensor signals, using a sensor unit, indicating a braking request or a deceleration and a lateral offset of the vehicle, wherein the commercial vehicle includes a braking system, which is configured, based on a steering demand, to brake dissymmetrically side wheels of the vehicle to steer the vehicle based on a resulting yaw moment;

generating, based on the sensor signals, a brake indication signal and the steering demand, wherein when the steering demand is below a predetermined threshold value, generating a steering signal only when the brake indication signal indicates a braking request, and wherein when the steering demand exceeds the predetermined threshold value, generating the steering signal even when the brake indication signal is not present or indicates no braking request; and providing the steering signal to the braking system to brake at least one side wheel of the vehicle;

wherein the sensor unit includes at least one sensor to detect a misalignment representing the lateral offset, of the vehicle with a traffic lane, and wherein a control module is configured to receive, as the steering demand, a sensor signal from the at least one sensor indicating the misalignment and to generate the steering signal to correct the misalignment and to further follow the traffic lane, wherein the commercial vehicle includes a traffic jam assist unit to operate the vehicle in a traffic jam assistant mode, and wherein the control module is configured to steer the vehicle in the traffic jam assistant mode based on the steering signal, wherein the commercial vehicle includes a steering system to steer wheels in response to a primary steering signal by controlling a steering angle of steered wheels, wherein the control module includes a selection module configured to select a first steering mode or a second steering mode, wherein in the second steering mode the vehicle is steered by controlling a braking signal for at least one vehicle wheel, and wherein the control module is configured to generate the steering signal when the second steering mode is selected, wherein the traffic jam assist unit is configured to generate a steer-by-brake signal and provide the steer-by-brake signal to braking system actuators assigned to the steer-by-brake function to dissymmetrically brake wheels of the vehicle to correct an orientation of the vehicle, wherein when the traffic jam assistant mode is activated, the steering control system is switched in the second steering mode to enable the steer-by-brake function, by using the steer-by-brake signal as the steering signal, wherein the lateral offset is any state, position or orientation of the vehicle that is corrected or compensated for by steering the vehicle, wherein the sensor unit includes a braking sensor, including a camera, radar, lidar, or ultrasonic sensor, for detecting the lateral offset, wherein deviations smaller than a threshold deviation associated to the predetermined threshold value from an ideal position, orientation or state of the vehicle are corrected immediately if the vehicle is to brake, otherwise the correction is postponed until a future braking request which is used to compensate the lateral offset, wherein when the deviation does require an immediate action, the steering control system does not wait until the next brake action, but corrects the state, position or orientation immediately by using the steer-by-brake function, wherein the action is made based on a threshold which indicates the threshold deviation from the ideal state, position or orientation.

* * * * *